(12) United States Patent
Drake et al.

(10) Patent No.: US 8,102,297 B2
(45) Date of Patent: Jan. 24, 2012

(54) METHOD AND SYSTEM FOR DEINTERLEAVING SIGNALS

(75) Inventors: Samuel Picton Drake, Adelaide (AU); Brian David Anderson, Red Hill (AU); Changbin Yu, MacGregor (AU)

(73) Assignees: National ICT Australia Limited, Eveleigh, New South Wales (AU); The Commonwealth of Australia, of the Secretary, Department of Defense, Canberra, Australian Capital Territory (AU)

( * ) Notice: Subject to any disclaimer, the term of this patent is extended or adjusted under 35 U.S.C. 154(b) by 2 days.

(21) Appl. No.: 12/776,107

(22) Filed: May 7, 2010

(65) Prior Publication Data

US 2011/0274217 A1 Nov. 10, 2011

(51) Int. Cl.
*G01S 7/42* (2006.01)
(52) U.S. Cl. .......................................... 342/13; 342/147
(58) Field of Classification Search ................... 342/13, 342/147
See application file for complete search history.

(56) References Cited

U.S. PATENT DOCUMENTS

| 6,985,102 B1 | 1/2006 | Horn et al. | |
| 7,397,415 B1 * | 7/2008 | Wang et al. | 342/13 |
| 7,830,297 B1 * | 11/2010 | Wang et al. | 342/13 |

OTHER PUBLICATIONS

T. Conroy and J. B. Moore, "The limits of extended Kalman filtering for pulse train deinterleaving," *Signal Processing, IEEE Transactions on*, vol. 46, pp. 3326-3332, 1998.
A Logothetis and V. Krishnamurthy, "An interval-amplitude algorithm for deinterleaving stochastic pulse train sources," *Signal Processing, IEEE Transactions on*, vol. 46, pp. 1344-1350, 1998.
D. J. Milojevic and B. M. Popovic, "Improved algorithm for the deinterleaving of radar pulses," *Radar and Signal Processing, IEE Proceedings F*, vol. 139, pp. 98-104, 1992.
J. B. Moore and V. Krishnamurthy, "Deinterleaving pulse trains using discrete-time stochastic dynamic-linear models," *Signal Processing, IEEE Transactions on*, vol. 42, pp. 3092-3103, 1994.
V. Chandra and R. C. Bajpai, "ESM data processing parametric deinterleaving approach," in TENCON '92. Technology Enabling Tomorrow : Computers, Communications and Automation towards the 21st Century.' 1992 IEEE Region 10 International Conference., 1992, pp. 26-30 vol. 1.
H. E. A. B. Hassan, F. Chan, and Y. T. Chan, "Queueing analysis of the deinterleaving of radar pulses in a dense emitter environment," in *Electrical and Computer Engineering, 2003. IEEE CCECE 2003. Canadian Conference on*, 2003, pp. 2015-2020 vol. 3.
H. E. A. B. Hassan, F. Chan, and Y. T. Chan, "Joint deinterleaving/recognition of radar pulses," in *Electrical and Computer Engineering, 2003. IEEE CCECE 2003. Canadian Conference on*, 2003, pp. 2009-2014 vol. 3.

(Continued)

*Primary Examiner* — Timothy A Brainard

(57) ABSTRACT

There are provided method and system for deinterleaving signals. The method comprises: (a) recording plural signal reception events, wherein each signal reception event is associated with a received signal at a receiver, and represented by a space-time coordinate having a space component based on a location of the receiver and a time component based on an arrival time of the received signal; (b) selecting a subset of signal reception events from the recorded signal reception events, wherein the number of signal reception events in the subset is based on the dimension of the space component; and (c) determining whether the signal reception events in the selected subset satisfy a predetermined condition, and if the determination is in the affirmative, associating the signal reception events in the selected subset with an emission of an emitter.

13 Claims, 6 Drawing Sheets

OTHER PUBLICATIONS

J. Wang, P. Lei, D. Yang, W. Li, and X. Yan, "A novel deinterleaving algorithm of radar pulse signal based on DSP," in *Industrial Electronics, 2009. ISIE 2009. IEEE International Symposium on*, 2009, pp. 1899-1903.

P. Yunwei, G. Zhilin, J. Weidong, and H. Laizhao, "A DOA-Based Separability Test and Confidence Evaluation Approach for Deinterleaving Pulse Sequence," in *Computational Intelligence and Industrial Application, 2008. PACIIA '08. Pacific-Asia Workshop on*, 2008, pp. 954-957.

F. J. Berle, "Mixed triangulation/trilateration technique for emitter location," *Communications, Radar and Signal Processing, IEE Proceedings F*, vol. 133, pp. 638-641, 1986.

A. N. Bishop and P. N. Pathirana, "Localization of Emitters via the Intersection of Bearing Lines: A Ghost Elimination Approach," *Vehicular Technology, IEEE Transactions on*, vol. 56, pp. 3106-3110, 2007.

H. W. L. Naus and C. V. van Wijk, "Simultaneous localisation of multiple emitters," *Radar, Sonar and Navigation, IEE Proceedings —*, vol. 151, pp. 65-70, 2004.

L. M. Blumenthal, *Applications of Distance Geometry*. Oxford: Oxford University Press, 1953.

"http://www.acam.de/fileadmin/Download/pdf/English/DB_AMPGX_e.pdf", "ATMD-GPX TDC-GPX Evaluation System: Datasheet," acam mess electronic, 2005.

G. E. James, "The Application of Time to Digital Converters to ESM Systems," in *1st EMRS DTC Technical Conference* Edinburgh, 2004, p. A15.

G. E. James, "The Practical Implementation of DF Systems Using Time-to-Digital Converters," in *2nd EMRS DTC Technical Conference*, Edinburgh, 2005, p. A8.

C. W. Misner, K. S. Thorne, and J. A. Wheeler, *Gravitation*: W. H. Freeman and Company, 1973.

S. Weinberg, Gravitation and cosmology: principles and applications of the general theory of relativity. New York: Wiley, 1972.

S. P. Drake, B. D. O. Anderson, and C. Yu, "Causal association of electromagnetic signals using the Cayley—Menger determinant," *Applied Physics Letters*, vol. 95, pp. 034106-3, 2009.

\* cited by examiner

METHOD AND SYSTEM FOR DEINTERLEAVING SIGNALS

TECHNICAL FIELD

This description generally concerns deinterleaving of signals, and in particular, a method, system and software for deinterleaving signals.

BACKGROUND

In many applications such as Electronic Support Measures (ESMs), it is important to determine the number, type and location of emitters in the environment. The process of associating the received signals to emitters is known as deinterleaving and in rich electromagnetic environments this can be extremely difficult.

Traditional approaches to deinterleaving separate signals on the basis of some of the signal parameters such as the carrier frequency, modulation scheme, or in the case of radars the where the signal is composed of a discrete pulses, pulse repetition pattern, pulse width, or pulse modulation scheme [1-4].

SUMMARY

According to a first aspect, there is provided a method for deinterleaving signals, comprising
  (a) recording plural signal reception events, wherein each signal reception event is associated with a received signal at a receiver, and represented by a space-time coordinate having a space component based on a location of the receiver and a time component based on an arrival time of the received signal;
  (b) selecting a subset of signal reception events from the recorded signal reception events, wherein the number of signal reception events in the subset is based on the dimension of the space component; and
  (c) determining whether the signal reception events in the selected subset satisfy a predetermined condition, and if the determination is in the affirmative, associating the signal reception events in the selected subset with an emission of an emitter.

Using the method, signals that arrive at different arrival times and at different receivers are associated with an emitter based on the arrival times and location of the receivers. The method can be applied to a subset of signal reception events at a time, where the number of signal reception events in the subset is based on the dimension of the space component. The method has application in various fields, such as for deinterleaving signal reception events such as radar pulses in a defence application.

The method is to be contrasted with techniques that require collection or calculation of large amount of emitter characteristics data, such as transmitter power, carrier frequency, modulation of pulse and pulse train cross correlation [5-11]. Measurement of the modulation of pulse generally requires very high sampling rates and hence is generally more expensive, heavier and has hardware with higher power consumption.

The method is also to be contrasted with techniques that require estimation of pulse train cross correlation, which requires a continuous stream of pulse to be recorded by at least two receivers. If the pulse train is not long enough or there are many emitters, it is often not possible to separate out the emitting radar signals. Further, when multipath is present (where the reflection of emitted signals from an object prior to being received), the received signals are often become mixed in with the unobstructed signals. Also, the brevity of this dwell time means that is often impossible to calculate pulse train cross correlation for radars in surveillance mode that scan continuously and hence only dwell for about tens of milliseconds on a receiver.

Further, techniques that generate angle of arrivals to estimate number and angle of arrival of emitters [21] might be unable to separate emitters that are near the same bearing lines and "ghost" emitters that are indistinguishable from real emitters may occur [12-14].

The number of signal reception events in the subset may be four if the space component is two dimensional, or five if the space component is three dimensional. The predetermined condition may be that signal reception events in the selected subset lie on a light-cone of the emission.

Step (c) may comprise calculating a Cayley-Menger determinant of the selected subset of signal reception events and determining whether the calculated Cayley-Menger determinant satisfies the predetermined condition. Calculating the Cayley-Menger determinant may further comprise calculating Euclidean space-time distances between one signal reception event and every other signal reception events in the selected subset of signal reception events.

The predetermined condition may be a hypothesis test, such as to take into account signal noises.

The method may further comprise determining the number of emission events based on the number of subset of signal reception events that are from the same emission.

The emitter may lie on a first plane above or below a second plane on which the receiver lies. In this case, the height of the emitter on the first plane is significantly less than the mean distance between the emitter and the receiver.

The receiver may be an antenna array comprising a plurality of receivers located apart in space. In one application, signals received from the plurality of emitters may be radar pulses.

The method may further comprise repeating step (b) to select another subset of signal reception events and repeating step (c) until all combinations of signal reception events are selected.

According to a second aspect, there is provided a computer program comprising executable instructions recorded on a computer-readable medium, the program being operable to perform the method for deinterleaving signals according to the first aspect.

According to a third aspect, there is provided a system for deinterleaving signals, comprising a processor operable to:
  (a) record plural signal reception events, wherein each signal reception event is associated with a received signal at a receiver, and represented by a space-time coordinate having a space component based on a location of the receiver and a time component based on an arrival time of the received signal;
  (b) select a subset of signal reception events from the recorded signal reception events, wherein the number of signal reception events in the subset is based on the dimension of the space component; and
  (c) determine whether the signal reception events in the selected subset satisfy a predetermined condition, and if the determination is in the affirmative, associate the signal reception events in the selected subset with an emission of an emitter.

BRIEF DESCRIPTION OF DRAWINGS

Non-limiting example(s) of the method and system will now be described with reference to the accompanying drawings, in which.

DETAILED DESCRIPTION

Figure 1:
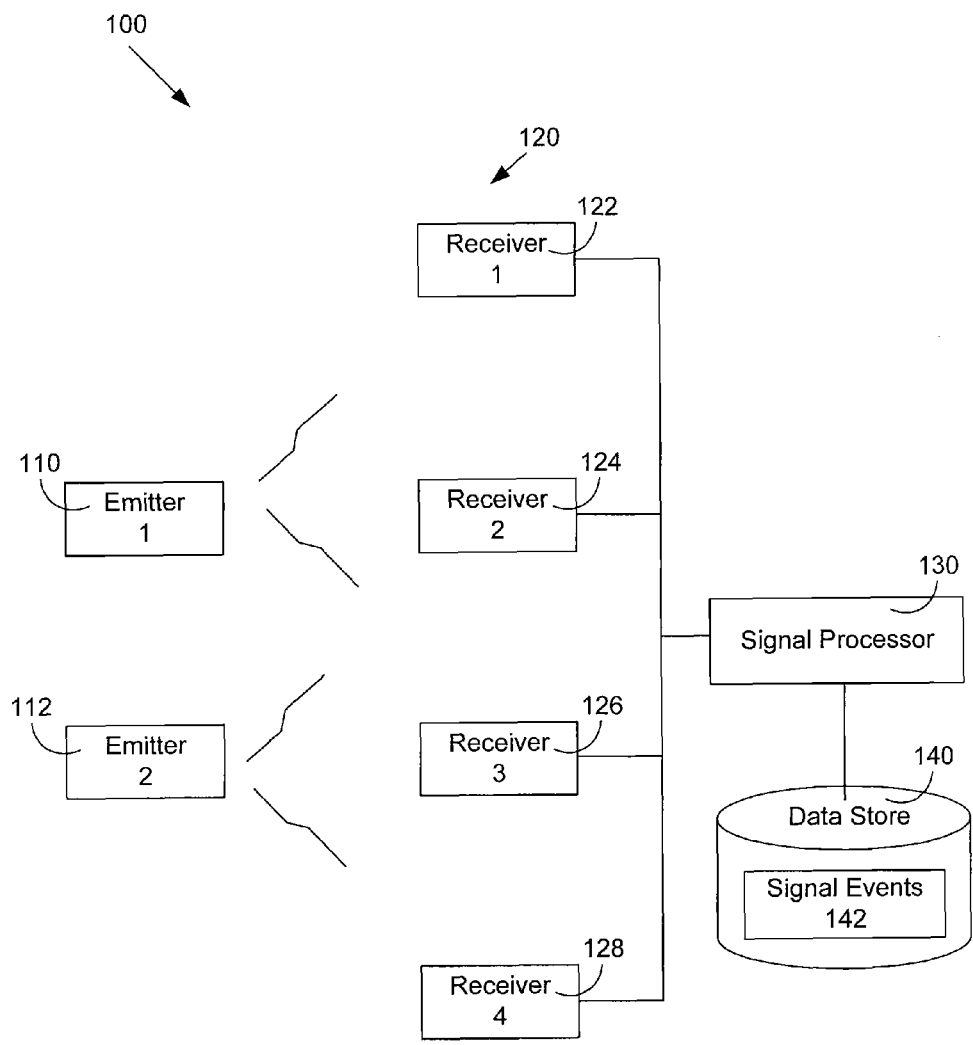
FIG. 1 is a schematic diagram of system with a plurality of receivers and emitters.

Referring first to FIG. 1, the system 100 comprises a plurality of emitters 110, 112 emitting electromagnetic signals and an antenna array 120 comprising a plurality of receivers 122, 124, 126, 128 capable of accurately measuring the time difference of arrival of signals. The antenna array 120 may be constructed using a precise time interval measuring unit such as the ATMD-GPX [16-18].

The system 100 further comprises a signal processor 130 that records signal reception events based on signals received at the antenna array 120. A data store 140 is accessible by the signal processor 130 to store the signal reception events 142.

A signal reception event represents a point on a space-time diagram. For example in the 2+1 Cartesian space time coordinates, a signal reception event comprises three parameters:

[ct, x, y], where c is the speed of light, t is a time component representing the time of arrival of a signal received at a receiver 122, 124, 126, 128 in time domain, and (x, y) is a space component in the form of a two-dimensional coordinate of the receiver 122, 124, 126, 128 in Cartesian space domain.

In this example, the two-dimensional of the receivers 122, 124, 126, 128 when placed on the same plane on a square are:

$$p_1 = \begin{bmatrix} 3 \\ 0 \end{bmatrix}, p_2 = \begin{bmatrix} 0 \\ 3 \end{bmatrix}, p_3 = \begin{bmatrix} -3 \\ 0 \end{bmatrix}, p_4 = \begin{bmatrix} 0 \\ -3 \end{bmatrix},$$

where $p_i$ is the two-dimensional coordinates of the ith receiver antenna in the space domain and i=1, ..., 4.

Due to multipath and scattering, different versions of the signals emitted by the emitters 110, 112 arrive at the receivers 122, 124, 126, 128 at different times. Consider a situation where three emitted signals arrive at each of the four receivers 122, 124, 126, 128 due to multipath propagation. The time of arrival of the respective signal is provided below in nanoseconds:

TABLE 1

Arrival Times in Nanoseconds

|  | First Signal | Second Signal | Third Signal |
| --- | --- | --- | --- |
| Receiver 122 | 10.8000 | 13.3777 | 26.4210 |
| Receiver 124 | 10.7780 | 12.5963 | 18.1737 |
| Receiver 126 | 6.8247 | 21.2730 | 24.6170 |
| Receiver 128 | 14.9967 | 17.9013 | 27.3223 |

Figure 2:
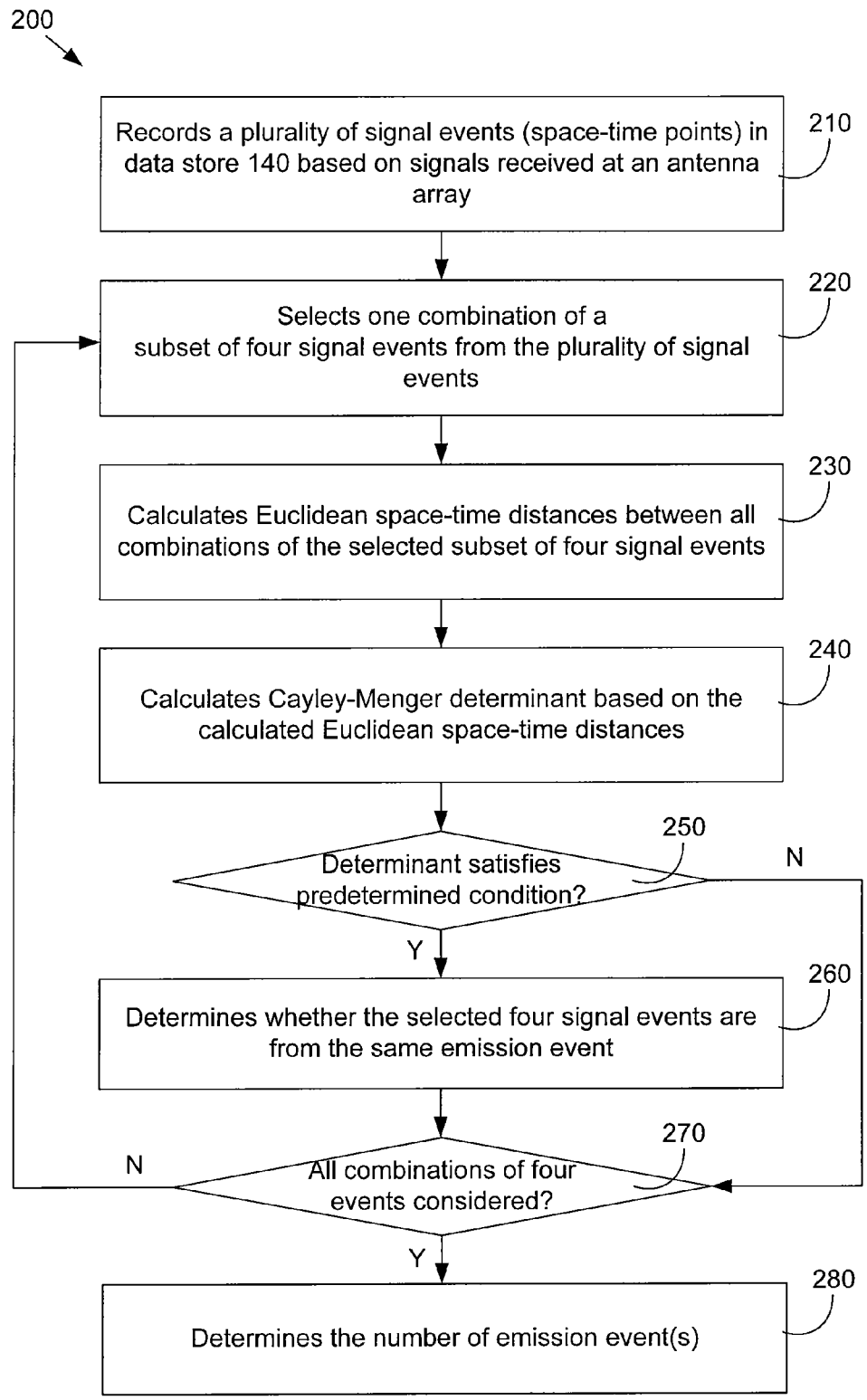
FIG. 2 is a flowchart of steps performed by a signal processor.

Referring now to the flowchart in FIG. 2, the task of the signal processor 130 is to deinterleave the received signals, i.e. to determine which of the signals are associated with the same emission of an emitter 110, 112 or different ones. An emission is represented by a space-time coordinate of a signal emission by an emitter 110, 112.

Based on the three received signals at each of the four receivers 122, 124, 126, 128, the signal processor 130 records the signal reception events in Table 2; see step 210. Each signal reception event is represented by a space-time coordinate having a two-dimensional space component and a one-dimensional time component. The space component represents the coordinate of the receiver's location in meters and the time component represents the arrival time of the signal in nanoseconds.

TABLE 2

Signal Reception Events

| Receiver locations relative to the center of the antenna array in meters | Signal reception events represented by space-time coordinates comprising a time component in nanoseconds and a two-dimensional space component in meters | | |
| --- | --- | --- | --- |
| 122 – $p_1 = [3,0]^T$ | $[10.8000, 3, 0]^T$ | $[13.3777, 3, 0]^T$ | $[26.4210, 3, 0]^T$ |
| 124 – $p_2 = [0,3]^T$ | $[10.7780, 0, 3]^T$ | $[12.5963, 0, 3]^T$ | $[18.1737, 0, 3]^T$ |
| 126 – $p_3 = [-3,0]^T$ | $[6.8247, -3, 0]^T$ | $[21.2730, -3, 0]^T$ | $[24.6170, -3, 0]^T$ |
| 128 – $p_4 = [0,-3]^T$ | $[14.9967, 0, -3]^T$ | $[17.9013, 0, -3]^T$ | $[27.3223, 0, -3]^T$ |

To associate the signal reception events with the emitters 110, 112, the signal processor 130 relies on the knowledge that signal reception events that lie on the same light-cone are causally connected to the same emission event of an emitter 110, 112, and as such, the Cayley-Menger determinant D constructed from the geodesic distances on the surface of the light-cone of the events is zero. In an environment where the time of arrival measurements are noisy, the Cayley-Menger determinant D can be tested against a predetermined condition in the form of hypothesis test $H_0$ that will be defined below.

To explain the remaining steps in FIG. 2, the Cayley-Menger determinant D, Euclidean distances $s_{ij}^2$ and hypothesis test $H_0$ for D in a noisy environment are first discussed.

Cayley-Menger Determinant

For 2+1 signal reception events, the Cayley-Menger determinant D for four signal reception events is defined as [13]:

$$D \equiv det \begin{bmatrix} 0 & s_{12}^2 & s_{13}^2 & s_{14}^2 & 1 \\ s_{21}^2 & 0 & s_{23}^2 & s_{24}^2 & 1 \\ s_{31}^2 & s_{32}^2 & 0 & s_{34}^2 & 1 \\ s_{41}^2 & s_{42}^2 & s_{43}^2 & 0 & 1 \\ 1 & 1 & 1 & 1 & 0 \end{bmatrix}. \quad (1)$$

where $s_{ij}^2$ is the squared geodesic (shortest) distance between any two signal reception events in the space and i,j=1, ..., 4.

The Cayley-Menger determinant D can be used to determine whether a surface defined by four signal reception events is flat [7]. The Cayley-Menger determinant D for a flat surface is zero if the distance between points on the surface is the geodesic distance which, in general, is not the Euclidean distance.

The proof of this more general result can be verified by following the proof in Euclidean geometry in [9] and realizing that the result generalises so long as there exists a coordinate system in which the metric tensor has constant coefficients, which is an equivalent definition of the flatness of a surface [6].

From this, it can be derived that the Cayley-Menger determinant D is zero in 2+1 Minkowski space time if the signal reception space-time events lie on a plane. If the Minkowski metric is used to calculate the space time interval then $s_{ij}^2$ may be positive or negative depending on the signature of the Minkowski metric.

As the Cayley-Menger determinant D specified by Eq. (1) only contains terms that are cubic in $s_{ij}^2$, for errorless measurements:

$$D = \begin{cases} 0 & \text{If all points lie on a flat surface.} \\ O(s_{ij}^6) & \text{If any points do not lie on a flat surface.} \end{cases} \quad (2)$$

In 2+1 space time, the light-cone is a two dimensional surface defined by all the possible paths of a photon emitted at a particular space-time point. Using the condition stated in Eq. (2), the Cayley-Menger determinant is zero for all space-time events that lie on the same light-cone and hence are causally connected to the same emission event.

Distances, Flatness and the Cayley-Menger Determinant

Following the definition of the Cayley-Menger determinant D in Eq. (1), it can be extended to flat non-Euclidean spaces. Specifically, it can be derived that D=0 if all the points lie on a flat two dimensional surface, such as a cone or a cylinder. This result is the specific instantiation of the more general result below.

Theorem 1. If n points $\vec{x}_1, \ldots, \vec{x}_n$ lie in an m dimensional flat space where m≤n−2 then the squared distance $s_{ij}^2$ between any pair of points $(\vec{x}_i, \vec{x}_j)$ can be expressed as:

$$s_{ij}^2 = g\alpha\beta(x_i^\alpha - x_j^\alpha)(x_i^\beta - x_j^\beta)$$

where gαβ is an array of constants, det(M)=0, and M is of size (n+1)×(n+1)

$$M \equiv \begin{bmatrix} 0 & s_{12}^2 & \cdots & s_{1n}^2 & 1 \\ s_{21}^2 & 0 & \cdots & s_{2n}^2 & 1 \\ \vdots & \vdots & \vdots & \ddots & \vdots \\ s_{n1}^2 & s_{n2}^2 & \cdots & 0 & 1 \\ 1 & 1 & \cdots & 1 & 0 \end{bmatrix}.$$

Proof Define the matrices A and B of size (n+1)×(m+2) and (m+2)×(n+1) respectively as:

$$A \equiv \begin{bmatrix} g_{\alpha\beta}x_1^\alpha x_1^\beta & 2x_1^\alpha \vec{e}_\alpha^T & 1 \\ \vdots & \vdots & \vdots \\ g_{\alpha\beta}x_n^\alpha x_n^\beta & 2x_n^\alpha \vec{e}_\alpha^T & 1 \\ 1 & \vec{0}^T & 0 \end{bmatrix}$$

$$B \equiv \begin{bmatrix} 1 & \cdots & 1 & 0 \\ -x_1^\alpha \vec{e}_\alpha & \cdots & -x_n^\alpha \vec{e}_\alpha & \vec{0} \\ g_{\alpha\beta}x_1^\alpha x_1^\beta & \cdots & g_{\alpha\beta}x_n^\alpha x_n^\beta & 1 \end{bmatrix}$$

$\vec{e}_\alpha$ is the m-dimensional basis vector in the α direction and $g\alpha\beta \equiv \vec{e}_\alpha \cdot \vec{e}_\beta$. These definitions yield

M=AB

Now because m≤n−2 implies A has fewer columns than rows, it is immediate that M is singular, with rank at most $m+2$.

It follows that the Cayley-Menger determinant D for m+2 points on an m hypersurface in m+1 dimensional space is zero if and only if the metric tensor that defines the distances in the hyperspace can be made up of constants.

If the metric tensor is constant then the Riemann curvature tensor is zero by definition [19, 20] and is referred to as Riemann flat or just flat. The distance between two points is independent of the coordinate system used; hence the Riemann tensor for Euclidean space is flat in polar coordinates, even though in these coordinates the metric tensor is not constant.

Evaluation of the Cayley-Menger determinant D using Eq. (1) requires knowledge of the geodesic distance between points on the light-cone. Calculation of the geodesic distance requires determining the metric tensor for the embedded conical surface and integrating the corresponding geodesic equation [6].

Figure 3:
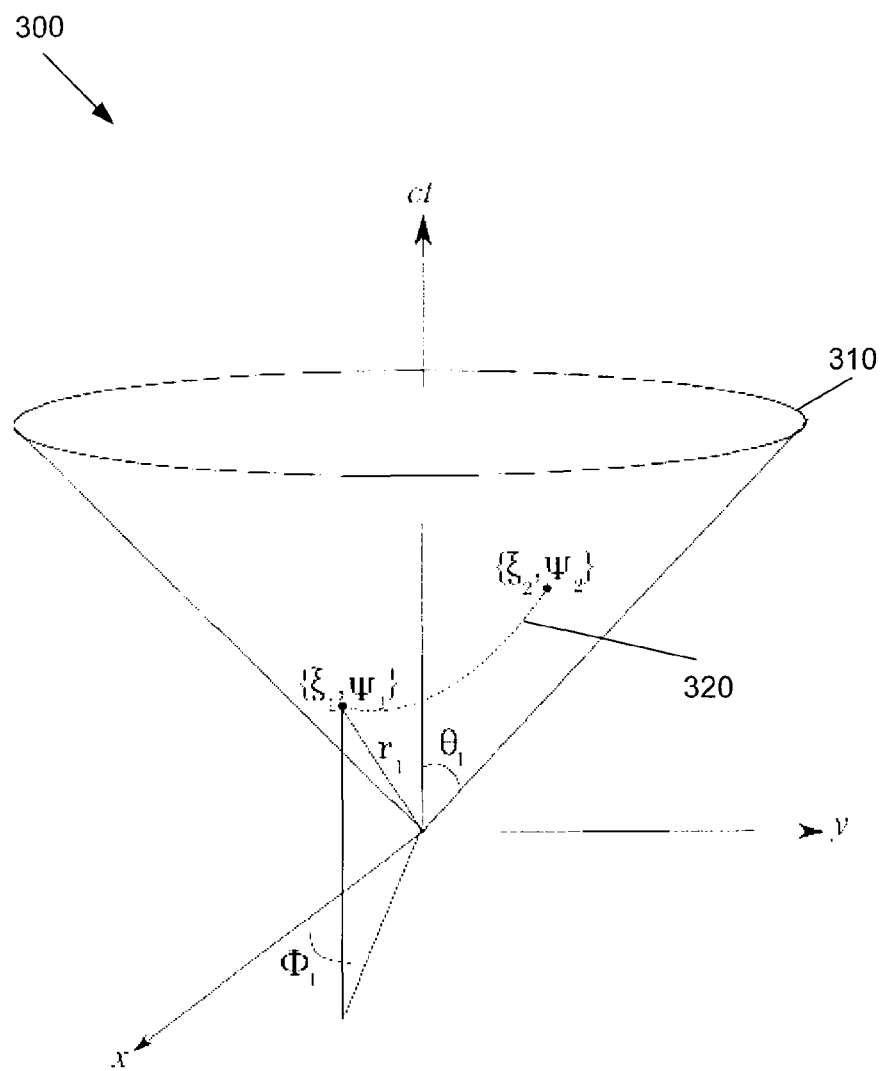
FIG. 3 is a graph showing a light cone and a geodesic curved in Cartesian space time coordinates.

This process can be simplified considerably by choosing an appropriate set of conical coordinates {ξ, ψ, ζ} so that the metric tensor is diagonal and constant on the surface of the light-cone 310 in Cartesian coordinates [ct,(x,y)] in FIG. 3. The coordinates {ξ, ψ, ζ} are the conical coordinates derived in [21] and describe positions on the cone. If this can be done then the geodesic distance 320 is the Euclidean distance in these coordinates.

One such set of coordinates is given by:

$$\xi = r\cos(\phi \sin\theta), \quad (3a)$$

$$\psi = r\sin(\phi \sin\theta), \quad (3b)$$

$$\zeta = \theta, \quad (3c)$$

and the corresponding inverse relations:

$$r = \sqrt{\xi^2 + \psi^2},\quad (4a)$$

$$\phi = \frac{1}{\sin \zeta}\arctan\left(\frac{\psi}{\xi}\right),\quad (4b)$$

$$\theta = \zeta,\quad (4c)$$

where $\{r, \theta, \phi\}$ are the spherical polar coordinates.

The spherical polar coordinates $\{r, \theta, \phi\}$ are used as an intermediate step to transition from Cartesian to conical coordinates, and are related to the 2+1 Cartesian space-time coordinates by:

$$r = \sqrt{(x-x_0)^2 + (y-y_0)^2 + (t-t_0)^2},\quad (5a)$$

$$\phi = \arctan\left(\frac{y-y_0}{x-x_0}\right),\quad (5b)$$

$$\theta = \arctan\left(\frac{t-t_0}{\sqrt{(x-x_0)^2 + (y-y_0)^2}}\right),\quad (5c)$$

where time is measured in natural units, i.e., c=1 and $[t_0,x_0,y_0]$ is the space-time coordinate of the emission event. Note that the coordinates defined by Equations (3-5) are not the conical coordinates as defined by [10], they have been formulated so that the metric tensor on the cone is diagonal and constant.

The infinitesimal Euclidean distance between two points in coordinates defined by Eq. (2) is:

$$ds^2 = d\xi^2 + d\psi^2 + (\xi^2+\psi^2)\left[1+\arctan\left(\frac{\psi}{\xi}\right)^2 \cot \zeta^2\right]d\zeta^2 +$$

$$2\psi \arctan\left(\frac{\psi}{\xi}\right)\cot \zeta d\xi d\zeta - 2\xi \arctan\left(\frac{\psi}{\xi}\right)\cot \zeta d\psi d\zeta.$$

If we constrain the path between any two points to be on the light-cone so that $\zeta=\pi/4$ then the geodesic distance between any two points $\{\xi_i, \psi_i, \zeta_i=\pi/4\}$ and $\{\xi_j, \psi_j, \zeta_j=\pi/4\}$ is:

$$s_{ij}^2 = (\xi_i-\xi_j)^2 + (\psi_i-\psi_j)_2.\quad (6)$$

One aim of signal association algorithms is to provide information so that the emitter may be localised. Calculation of the Cayley-Menger determinant D in Eq. (1) using Eq. (6) requires the space-time coordinates of the emission event for insertion into Eq. (5) and hence would not appear to be useful.

However, the difficulty is alleviated, or overcome, by noting that in the far-field limit the geodesic distance on the light-cone can be approximated by a quantity that is obtainable from the measurements, viz. the Euclidean distance, i.e., $$(\xi_i-\xi_j)^2+(\psi_i-\psi_j)^2 \approx (x_i-x_j)^2+(y_i-y_j)^2+(t_i-t_j)^2$$

The far field approximation is valid if the difference between the geodesic distance on the light-cone and the Euclidean distance is much less than the Euclidean distance. It can be shown that this condition is equivalent to the inter-antenna spatial distances being much less than the spatial distance to the emitter, i.e., $$\sqrt{(x_i-x_0)^2 + (y_i-y_0)^2} \gg \sqrt{(x_i-x_j)^2+(y_i-y_j)^2},$$

as in a radar application.

Hypothesis Test in a Noisy Environment

In practical scenarios, the measured signal time of arrival is generally noisy. This means that the value of D from Eq. (1) and computed using actual measurements will not be zero, even if all the points lie on a flat surface.

To calculate the expected value of Cayley-Menger determinant D in the presence of noise, a noise term $\epsilon_i^t$ is added to each of the signal reception events. The square distance is then calculated as a function of the noiseless distances and the noise. These distances are then substituted into Eq. (1) to obtain an expression for the Cayley-Menger determinant D in terms of the noiseless space-time distances and $\epsilon_i^t$.

This rather complex procedure can be avoided and the effect of noise on Eq. (1) can be approximated by a rather simple expression once it is realized the Cayley-Menger determinant D contains only terms of the type $s_{ij}^2 s_{kl}^2 s_{mn}^2$ and hence, to lowest order, the effect of noise can be approximated by $s_m^4 \sigma_t^2$, where $s_m^2$ is the maximum square interval between events and $\sigma_t^2$ is the variance in the time of arrival noise.

Using this result, it is possible to construct a hypothesis test:

$H_0$: All receive events are caused by the same emission event.

The decision rule we use to test between the hypothesis is:

$$H_0 = \begin{cases} \text{true} & \text{If } D \le 2(1.96\sigma_t)^2 s_m^4, \\ \text{false} & \text{If } D > 2(1.96\sigma_t)^2 s_m^4. \end{cases}\quad (7)$$

The factors 2 and 1.96 come from the fact that the time difference variance is twice the time of arrival variance and that 95% of time of arrival measurements lie between $\pm 1.96\sigma_t$ of the noiseless time of arrival.

Algorithm

Referring to FIG. 2 again, the signal processor 130 performs the following steps for deinterleaving the signal reception events recorded in Table 2.

Figure 4:
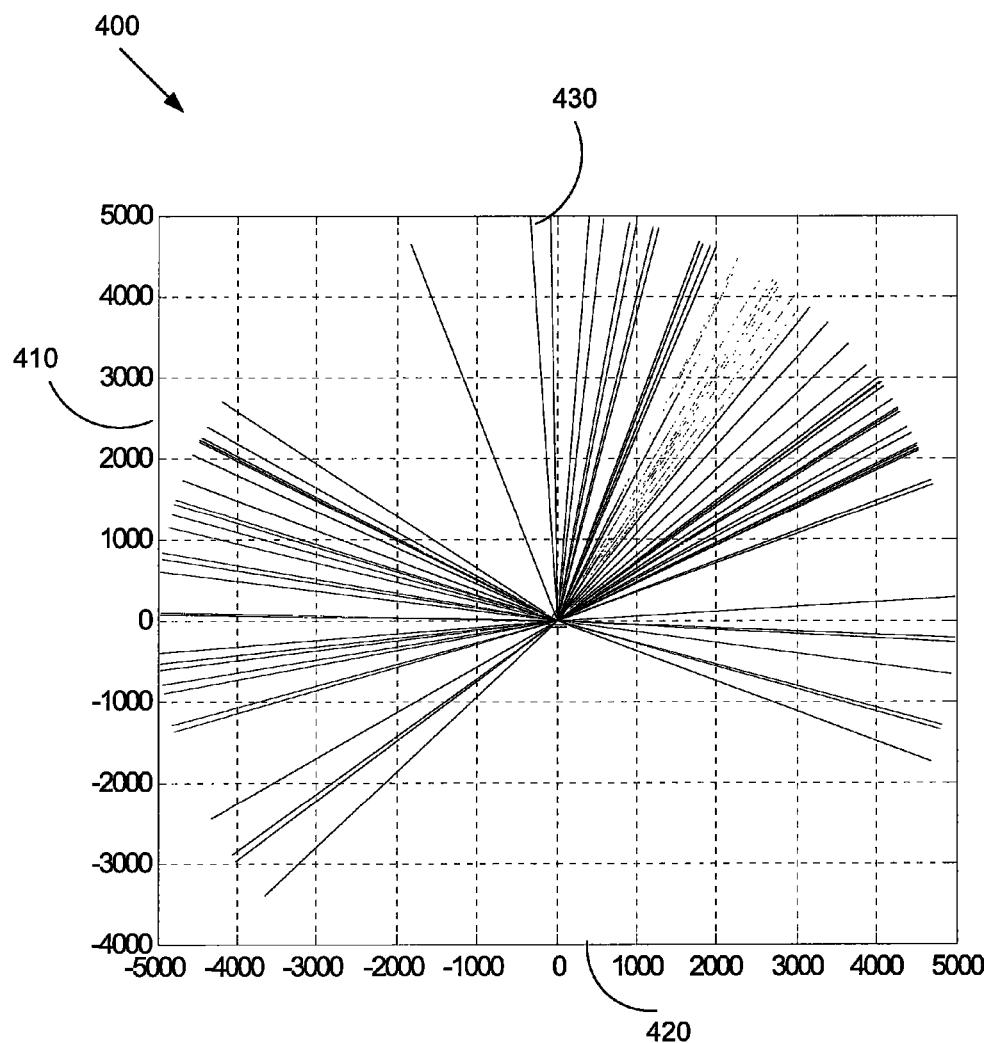
FIG. 4 is a chart of all possible 81 bearing lines for the emitters based on the combinations of quartets of received signal space-time events given in Table 2.

(a) The signal processor 130 first selects a subset of four signal reception events are selected; see step 220 in FIG. 2. There are $3^4$ combinations in which the signal reception events can be grouped into quartets, and the bearing lines 430 associated with the 81 combinations in total are shown in FIG. 4. The x-axis 410 and y-axis 420 of the chart each represent distance in meters.

For example, in the first iteration, the following signal reception space-time events are selected:
$m_1$=[13.3777, 3, 0], which is detected at receiver 122;
$m_2$=[10.7780, 0, 3], which is detected at receiver 124;
$m_3$=[24.6170, −3, 0], which is detected at receiver 126; and
$m_4$=[27.3223, 0, −3], which is detected at receiver 128.

(b) As shown in step 230 in FIG. 2, the signal processor 130 then calculates the Euclidean space-time distances $s_{ij}^2$ between one signal reception event with the other three signal reception events in the selected subset according to Eq. (6) for i=1, ..., 4, j=1, ..., 4 and i≠j For example, $s_{14}^2$ is a function of $m_1$ and $m_4$ and $s_{23}^2$ is a function of $m_2$ and $m_3$. Distances $s_{11}^2$, $s_{22}^2$, $s_{33}^2$ and $s_{44}^2$ are not calculated because they are set to zero according to Eq. (1).

(c) Based on the calculated Euclidean distances $s_{ij}^2$, the signal processor 130 then calculates the Cayley-Menger determinant D using Eq. (1); see step 240 in FIG. 2.

(d) The signal processor 130 then determines whether the calculated determinant D satisfies a predetermined condition in the form of hypothesis test $H_0$ according to Eq. (7); see step 250 in FIG. 2.

(e) If $H_0$ is true, the signal processor 130 associates the four signal reception events selected in step (a) with the same emission of an emitter; see step 260. For example, this involves recording the mapping between the four signal reception events and the emission event in a data store accessible by the signal processor 130.

(f) The signal processor 130 then determines whether there is at least one more combination of four signal reception events $m_1$ to $m_4$ to be considered; see step 270. The same determination is performed if $H_0$ is false.

(g) When all combinations of four signal reception events are exhausted, the signal processor 130 determines the number of emission events, which is the number of subsets of four signal reception events that satisfy the hypothesis test $H_0$.

Results

In the example given in Table 2, the receiver clock noise is set to 50 picoseconds, and the threshold condition for the Cayley-Menger determinant D in step 250 is therefore 9.3312 square meters.

Using the algorithm 200 in FIG. 2, the signal processor 130 is able to conclude that there are only two valid subsets of signal reception events that satisfy the condition. This means that there are two emission events each having the following signal reception events:

Signal reception events corresponding to Emission Event 1:
$m_1 = [13.3777, 3, 0]^T$, $m_2 = [10.7780, 0, 3]^T$,
$m_3 = [24.6170, -3, 0]^T$ and $m_4 = [27.3223, 0, -3]^T$.

Signal reception events corresponding to Emission Event 2:
$l_1 = [26.4210, 3, 0]^T$, $l_2 = [18.1737, 0, 3]^T$,
$l_3 = [6.8247, -3, 0]^T$ and $l_4 = [14.9967, 0, -3]^T$.

Since each emission event is associated with an emitter 110, 112, the location of the emitters can be estimated using Time Difference of Arrival (TDOA) or Range Difference of Arrival (RDOA) techniques in [11], which is herein incorporated by reference.

Figure 5:
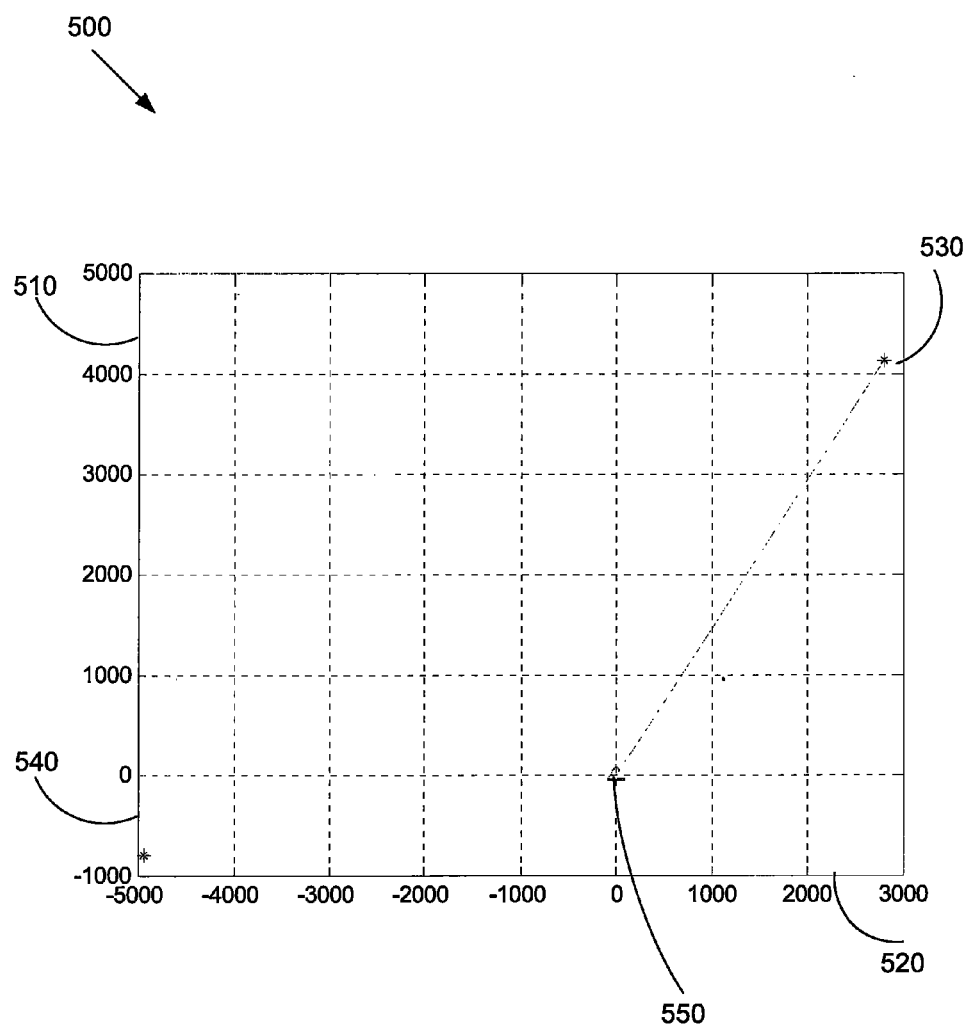
FIG. 5 is a chart showing the locations of receivers, and the true emitter locations and the bearing lines of the only space-time quartets that satisfy the hypothesis test given in Eq. (7).

Using these techniques, the locations of the emitters 110, 112 are calculated and represented in FIG. 5.

Location of Emitter 1 (indicated at 530)
X=2813,
Y=4134,
Bearing=55.7665.

Location of Emitter 2 (indicated at 540)
X=-4934,
Y=-807,
Bearing=-170.711.

The x (520) and y (510) axes in FIG. 5 each represent distance in meters. The numbers indicate that the emitters are each located 5 km from location of the antenna array 550.

It is noted that the size of the subset of signal reception events selected in step (a) is d+2, where d is the dimension of the space component in the space-time coordinates of the events. In the example above, four reception events are selected when 2+1 space-time coordinates are used. For 3+1 space-time coordinates, five reception events are selected.

It is also noted that the arrival times given in Table 1 are generated by adding zero mean Gaussian noise with 50 picoseconds standard deviation to the arrival time of signals generated by two emitters located 5 km from the centre of the antenna array, which is the same as calculated above. The third set of arrival times was generated by a random number generator and could represent spurious measurements.

The described method is applicable in various fields. For example, defence-related applications require the knowledge of the number of electromagnetic emitters and where they are. To be able to determine the number and location, it is necessary to find out whether signals received at different points and different times come from the same emitter or different ones. Further, the method is applicable to any type of signal reception events, such as radar pulses in defence-related applications.

System

Figure 6:
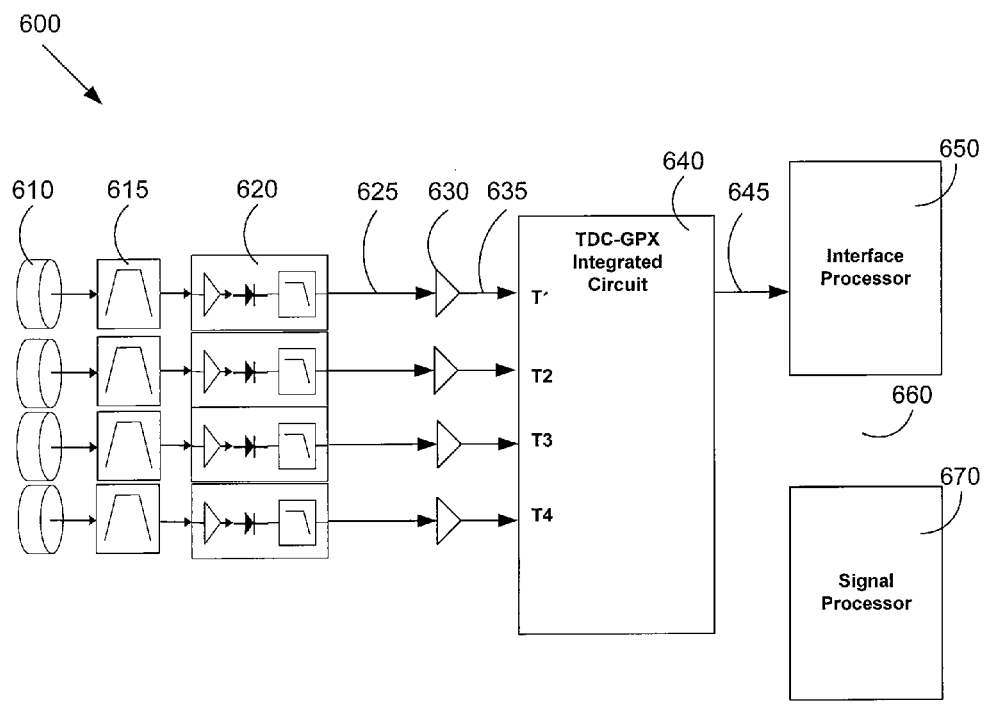
FIG. 6 is an exemplary system for deinterleaving signals.

One example of how the system for deinterleaving signals is implemented is shown in FIG. 6. The components of the exemplary system are as follows.

1. Cavity Backed Wideband Spiral Antennas 610

Cavity backed wideband spiral antennas 610 are used to receive incident radio frequency (RF) energy from the Emitter 110 112. Each antenna 610 has a wideband frequency response from 2-18 GHz to maximize probability of intercepting the signals. Spiral antennas are used to allow reception of both vertical and horizontally polarised signals.

2. Tunable Bandpass Yttrium Iron Garnet (YIG) filter 615

The signals received by the antennas 610 are passed through a tunable bandpass YIG filter to select signals within a 40 MHz bandwidth of the 2-18 GHz range. Bandpass filtering reduces the amount of noise in subsequent stages and eliminates unwanted signals.

3. Pre-Amplified Microwave Detector 620

The pre-amplifier amplifies weak signals from the emitter than have passed from the filter 615 and delivers the amplified signals to the detector. The detector 610 extracts modulation from the signals to convert the signals to a baseband or low amplitude video signal 625.

4. Video Amplifier 630

The video amplifier 630 amplifies often weak signal from the pre-amplified microwave detector 620 to a level suitable for further processing in the subsequent stage. The base level and polarity of the video signal may also be modified at this stage. The output signals 635 of the amplifier 630 are Low Voltage Transistor-Transistor Logic (LVTTL) compatible.

5. TDC Integrated Circuit 640

The four signals 635 from the video amplifiers 630 are inputted to a Time-to-Digital Converter (TDC) 640 to measure time difference of the signals. One suitable TDC is the TDC-GPX integrated circuit developed by ACAM Messelectronic GMBH of Germany (www.acam.de) that is operable to provide time difference measurement at 81 ps resolution.

6. Interface Processor 650

The first processor 650 interfaces with the ACAM TDC-GPX integrated circuit to extract time difference measurements and send them to a second Processor 670 via a communications link 660, which may be an Ethernet.

7. Signal Processor 670

The signal processor 670 receives the time difference measurements from the Interface Processor 650 to perform the algorithm in steps FIG. 2.

Error Calculations

In one embodiment, a source of error occurs when the emitter is not in the same plane as the receivers. The maximum effect of this error in calculating the Cayley-Menger determinant is explained as follows.

We first determine the difference between squared geodesic distances $\tilde{s}_{ij}^2$ and $s_{ij}^2$, where $\sim$ is used to denote that the emitter lies in the same plane as the receivers and the absence of a $\sim$ means that the emitter is z meters above the plane. The measured time of arrival (in natural units where c=1) for an emitter above the plane is:

$$t_i = t_0 + \sqrt{(x_i - x_0)^2 + z^2} \qquad (8)$$

$$= t_0 + \sqrt{(x_i - x_0)^2} \sqrt{1 + \frac{z^2}{(x_i - x_0)^2}} \qquad (9)$$

$$\approx t_0 + \sqrt{(x_i - x_0)^2} \left(1 + \frac{1}{2} \frac{z^2}{(x_i - x_0)^2}\right) \qquad (10)$$

$$= t_0 + \tilde{t}_i + \frac{1}{2} \frac{z^2}{\sqrt{(x_i - x_0)^2}} \qquad (11)$$

The approximation in (10) is valid if and only if $z^2 \ll (x_i - x_0)^2$, viz the height above the plane is much less than the distance from the emitter to the receivers. In practice, this condition is generally met if $$z < \sqrt{(x_i - x_0)^2} \Big/ 10.$$

The measured time difference of arrival is:

$$t_j - t_i = \tilde{t}_j - \tilde{t}_i + \frac{z^2}{2}\left(\frac{1}{\sqrt{(x_j - x_0)^2}} - \frac{1}{\sqrt{(x_i - x_0)^2}}\right) \qquad (12)$$

That is to say the effect of the emitter being a distance z from the plane of the receivers causes an error ($\epsilon_{ij}$) in the measured time difference of arrival of:

$$\epsilon_{ij} = \frac{z^2}{2}\left(\frac{1}{\sqrt{(x_j - x_0)^2}} - \frac{1}{\sqrt{(x_i - x_0)^2}}\right) \qquad (13)$$

The location of the receiver j can be expressed in terms of the receiver i by:

$$x_j = x_i + \Delta x \qquad (14)$$

It follows that:

$$(x_j - x_0)^2 = (x_i - x_0)^2 + 2\Delta x \cdot (x_i - x_0) + \Delta x^2$$

$$\approx (x_i - x_0)^2 + 2\Delta x \cdot (x_i - x_0) \qquad (15)$$

This approximation is valid if the receiver spacing is much less than the distance from the receivers to the emitters, this is normally the case is the required "far field" emitter receiver geometry for this application.

Using the approximation given in (15), it follows that:

$$\frac{1}{\sqrt{(x_j - x_0)^2}} \approx \frac{1}{\sqrt{(x_i - x_0)^2 + 2\Delta x \cdot (x_i - x_0)}} \qquad (16)$$

$$= \frac{1}{\sqrt{(x_i - x_0)^2}} \frac{1}{\sqrt{1 + 2\frac{\Delta x \cdot (x_i - x_0)}{(x_i - x_0)^2}}} \qquad (17)$$

$$\approx \frac{1}{\sqrt{(x_i - x_0)^2}}\left(1 - \frac{\Delta x \cdot (x_i - x_0)}{(x_i - x_0)^2}\right)$$

Substituting (18) into (13), the maximum time of arrival error caused by the emitter being off the plane is:

$$\|\epsilon_{ij}\| \leq \frac{z^2 \|\Delta x\|}{2(x_i - x_0)^2}. \qquad (19)$$

To reduce the effect of the off-plane error $\epsilon_{ij}$, the error should be much less than the receiver spacing, i.e. $\|\epsilon_{ij}\| \ll \|\Delta x\|$. This condition can be satisfied if:

$$\frac{z^2}{2(x_i - x_0)^2} \ll 1. \qquad (20)$$

In applications where the emitter lies on a plane located z meters above or below a plane on which the receivers lie, the effect of the approximation error is reduced if the height of the emitter is significantly less than the mean distance between the emitter and the receivers. In practice, this condition is generally satisfied when z is less than about one tenth of the distance from the emitter to the receivers.

It will be appreciated that while the light-cone is Lorentz invariant and hence at least one embodiment of this algorithm is independent of the velocity of the receivers and emitters, it can be generalised to non electromagnetic signals such as sonar and seismic waves as long as some assumption can be made about the velocity of the sensors relative to the emitter. In this case $c^2$ term in the calculation of the space-time interval is replaced by $v^2$ where v is the speed of the signal relative to the receivers.

Variations and Possible Modifications

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

While radar pulses have been used as an example, it is important to realize that the proposed algorithm is valid for associating any signal reception events that lie on the same light-cone. Furthermore although the following treatment assumes four receivers in 2+1 space time it can be extended trivially to five receivers in 3+1 space time. The method disclosed may also be adapted for sonar and seismic waves.

It is also noted that different antenna placements may improve the performance of the algorithm in FIG. 2. A fifth antenna element may be added on a different plane as the other elements in 3+1 space time. Once again, optimal placement of this fifth antenna may improve the performance of the signal processor. A sixth element may be used to measure the background noise and hence be used as a calibration tool. The algorithm in FIG. 2 may also be extended to include ducting, that is slightly varying light speed and non-linear path for the signals.

It should also be understood that, unless specifically stated otherwise as apparent from the following discussion, it is appreciated that throughout the description, discussions utilizing terms such as "receiving", "processing", "retrieving", "selecting", "calculating", "determining", "displaying", "associating" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices. Unless the context clearly requires otherwise, words using singular or plural number also include the plural or singular number respectively.

It should also be understood that the techniques described might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media (e.g. copper wire, coaxial cable, fibre optic media, specialised hardware). Exemplary carrier waves may take the form of electrical signals, electromagnetic signals, optical signals, sonic or sonar waves conveying digital data steams along a local network or a publically accessible network such as the Internet.

REFERENCES

[1] T. Conroy and J. B. Moore, "The limits of extended Kalman filtering for pulse train deinterleaving," *Signal Processing, IEEE Transactions on*, vol. 46, pp. 3326-3332, 1998.

[2] A. Logothetis and V. Krishnamurthy, "An interval-amplitude algorithm for deinterleaving stochastic pulse train sources," *Signal Processing, IEEE Transactions on*, vol. 46, pp. 1344-1350, 1998.

[3] D. J. Milojevic and B. M. Popovic, "Improved algorithm for the deinterleaving of radar pulses," *Radar and Signal Processing, IEE Proceedings F*, vol. 139, pp. 98-104, 1992.

[4] J. B. Moore and V. Krishnamurthy, "Deinterleaving pulse trains using discrete-time stochastic dynamic-linear models," *Signal Processing, IEEE Transactions on*, vol. 42, pp. 3092-3103, 1994.

[5] V. Chandra and R. C. Bajpai, "ESM data processing parametric deinterleaving approach," in *TENCON '92. "Technology Enabling Tomorrow: Computers, Communications and Automation towards the 21st Century.'1992 IEEE Region 10 International Conference.*, 1992, pp. 26-30 vol. 1.

[6] H. E. A. B. Hassan, F. Chan, and Y. T. Chan, "Queueing analysis of the deinterleaving of radar pulses in a dense emitter environment," in *Electrical and Computer Engineering, 2003. IEEE CCECE 2003. Canadian Conference on*, 2003, pp. 2015-2020 vol. 3.

[7] H. E. A. B. Hassan, F. Chan, and Y. T. Chan, "Joint deinterleaving/recognition of radar pulses," in *Electrical and Computer Engineering, 2003. IEEE CCECE 2003. Canadian Conference on*, 2003, pp. 2009-2014 vol. 3.

[8] J. Wang, P. Lei, D. Yang, W. Li, and X. Yan, "A novel deinterleaving algorithm of radar pulse signal based on DSP," in *Industrial Electronics, 2009. ISIE 2009. IEEE International Symposium on*, 2009, pp. 1899-1903.

[9] P. Yunwei, G. Zhilin, J. Weidong, and H. Laizhao, "A DOA-Based Separability Test and Confidence Evaluation Approach for Deinterleaving Pulse Sequence," in *Computational Intelligence and Industrial Application, 2008. PACIIA '08. Pacific-Asia Workshop on*, 2008, pp. 954-957.

[10] W. T. L. C. O. Horn and S. F. P. C. O. Hurt, "Method and system for deinterleaving," US, 2006.

[11] P. C. R. N. J. Wang, M. H. N.Y. Orr, M. W. N. J. Sparrow, and M. W. N. J. Apa, "System and method for detecting and de-interleaving radar emitters," US, 2008.

[12] F. J. Berle, "Mixed triangulation/trilateration technique for emitter location," *Communications, Radar and Signal Processing, IEE Proceedings F*, vol. 133, pp. 638-641, 1986.

[13] A. N. Bishop and P. N. Pathirana, "Localization of Emitters via the Intersection of Bearing Lines: A Ghost Elimination Approach," *Vehicular Technology, IEEE Transactions on*, vol. 56, pp. 3106-3110, 2007.

[14] H. W. L. Naus and C. V. van Wijk, "Simultaneous localisation of multiple emitters," *Radar, Sonar and Navigation, IEE Proceedings—*, vol. 151, pp. 65-70, 2004.

[15] L. M. Blumenthal, *Applications of Distance Geometry*. Oxford: Oxford University Press, 1953.

[16] "http://www.acam.de/fileadmin/Download/pdf/English/DB_AMGPX_e.pdf", "ATMD-GPX TDC-GPX Evaluation System: Datasheet," acam mess electronic, 2005.

[17] G. E. James, "The Application of Time to Digital Converters to ESM Systems," in *1st EMRS DTC Technical Conference* Edinburgh, 2004, p. A15.

[18] G. E. James, "The Practical Implementation of DF Systems Using Time-to-Digital Converters," in *2nd EMRS DTC Technical Conference*, Edinburgh, 2005, p. A8.

[19] C. W. Misner, K. S. Thorne, and J. A. Wheeler, *Gravitation*: W. H. Freeman and Company, 1973.

[20] S. Weinberg, *Gravitation and cosmology: principles and applications of the general theory of relativity*. New York: Wiley, 1972.

[21] S. P. Drake, B. D. O. Anderson, and C. Yu, "Causal association of electromagnetic signals using the Cayley-Menger determinant," *Applied Physics Letters*, vol. 95, pp. 034106-3, 2009.

The invention claimed is:

1. A method practiced by a processor and a data store for deinterleaving signals from receivers, the method comprising:
   (a) the processor recording plural signal reception events in the data store, wherein each signal reception event is associated with a received signal at a receiver, and represented by a space-time coordinate having a space component based on location of the receiver and a time component based on arrival time of the received signal;
   (b) the processor selecting a subset of signal reception events from the signal reception events recorded in the data store, wherein the number of signal reception events in the subset is based on the dimension of the space component; and
   (c) the processor determining whether the signal reception events in the selected subset satisfy a predetermined condition, and if the determination is in the affirmative, associating the signal reception events in the selected subset with an emission of an emitter.

2. The method of claim 1, wherein the number of signal reception events in the subset is four if the space component is two dimensional, or five if the space component is three dimensional.

3. The method of claim 1 or 2, wherein the predetermined condition is that signal reception events in the selected subset lie on a light-cone of the emission.

4. The method of claim 3, wherein step (c) comprises the processor calculating a Cayley-Menger determinant of the selected subset of signal reception events and determining whether the calculated Cayley-Menger determinant satisfies the predetermined condition.

5. The method of claim 4, wherein calculating the Cayley-Menger determinant further comprises the processor calculating Euclidean space-time distances between one signal reception event and every other signal reception events in the selected subset of signal reception events.

6. The method of claim 1, wherein the predetermined condition is a hypothesis test.

7. The method of claim 1, further comprising the processor determining the number of emission events based on the number of subset of signal reception events that are from the emission.

8. The method of claim 1, wherein the emitter lies on a first plane above or below a second plane on which the receiver lies, and the height of the emitter on the first plane is significantly less than the mean distance between the emitter and the receiver.

9. The method of claim 1, wherein the receiver is an antenna array comprising a plurality of receivers located apart in space.

10. The method of claim 1, wherein signals received from the plurality of emitters are radar pulses.

11. The method of claim 1, further comprising the processor repeating step (b) to select another subset of signal reception events and repeating step (c) until all combinations of signal reception events are selected.

12. A computer program comprising executable instructions recorded on a computer-readable medium, the program being operable to cause a processor to perform a method for deinterleaving signals comprising the steps of:
  (a) recording plural signal reception events in a data store, wherein each signal reception event is associated with a received signal at a receiver, and represented by a space-time coordinate having a space component based on location of the receiver and a time component based on arrival time of the received signal;
  (b) selecting a subset of signal reception events from the recorded signal reception events, wherein the number of signal reception events in the subset is based on the dimension of the space component; and
  (c) determining whether the signal reception events in the selected subset satisfy a predetermined condition, and if the determination is in the affirmative, associating the signal reception events in the selected subset with an emission of an emitter.

13. A system for deinterleaving signals, comprising a processor operable to:
  (a) record plural signal reception events, wherein each signal reception event is associated with a received signal at a receiver, and represented by a space-time coordinate having a space component based on a location of the receiver and a time component based on an arrival time of the received signal;
  (b) select a subset of signal reception events from the recorded signal reception events, wherein the number of signal reception events in the subset is based on the dimension of the space component; and
  (c) determine whether the signal reception events in the selected subset satisfy a predetermined condition, and if the determination is in the affirmative, associate the signal reception events in the selected subset with an emission of an emitter.

* * * * *